United States Patent
Tamura et al.

(10) Patent No.: US 9,966,603 B2
(45) Date of Patent: May 8, 2018

(54) NEGATIVE ELECTRODE CARBON MATERIAL FOR LITHIUM SECONDARY BATTERY, NEGATIVE ELECTRODE FOR LITHIUM SECONDARY BATTERY, AND LITHIUM SECONDARY BATTERY

(71) Applicant: NEC Corporation, Tokyo (JP)

(72) Inventors: Noriyuki Tamura, Tokyo (JP); Qian Cheng, Tokyo (JP); Ryota Yuge, Tokyo (JP)

(73) Assignee: NEC Corporation, Tokyo (JP)

( * ) Notice: Subject to any disclaimer, the term of this patent is extended or adjusted under 35 U.S.C. 154(b) by 69 days.

(21) Appl. No.: 14/779,254

(22) PCT Filed: Mar. 27, 2014

(86) PCT No.: PCT/JP2014/058821
§ 371 (c)(1),
(2) Date: Sep. 22, 2015

(87) PCT Pub. No.: WO2014/157503
PCT Pub. Date: Oct. 2, 2014

(65) Prior Publication Data
US 2016/0056466 A1 Feb. 25, 2016

(30) Foreign Application Priority Data

Mar. 29, 2013 (JP) ................. 2013-074469

(51) Int. Cl.
*H01M 4/587* (2010.01)
*H01M 4/133* (2010.01)
(Continued)

(52) U.S. Cl.
CPC ........... *H01M 4/587* (2013.01); *H01M 4/133* (2013.01); *H01M 4/483* (2013.01); *H01M 10/052* (2013.01); *H01M 2004/027* (2013.01)

(58) Field of Classification Search
None
See application file for complete search history.

(56) References Cited

U.S. PATENT DOCUMENTS

2012/0088151 A1 4/2012 Yamazaki et al.

FOREIGN PATENT DOCUMENTS

EP 2660199 A1 11/2013
JP H07-230803 A 8/1995
(Continued)

OTHER PUBLICATIONS

International Search Report corresponding PCT/JP2014/058821 dated Jul. 1, 2014 (2 pages).
(Continued)

*Primary Examiner* — Barbara L Gilliam
*Assistant Examiner* — Wyatt P McConnell
(74) *Attorney, Agent, or Firm* — Wilmer Cutler Pickering Hale and Dorr LLP

(57) ABSTRACT

The present invention has an object to provide a negative electrode carbon material capable of providing a lithium secondary battery improved in the capacity characteristic, and a negative electrode for a lithium secondary battery and a lithium secondary battery using the negative electrode carbon material. The negative electrode carbon material for a lithium secondary battery according to the present invention comprises an oxidized amorphous carbon material comprising oxidized graphene layers. The oxidized amorphous carbon material can be obtained by subjecting an amorphous carbon to an oxidation treatment so that graphene layers of carbon crystallites contained in the amorphous carbon are oxidized.

13 Claims, 1 Drawing Sheet

(51) Int. Cl.
*H01M 10/052* (2010.01)
*H01M 4/48* (2010.01)
*H01M 4/02* (2006.01)

(56) References Cited

FOREIGN PATENT DOCUMENTS

| JP | 2000-311686 A | 11/2000 |
|---|---|---|
| JP | 2000-315500 A | 11/2000 |
| JP | 2000-315501 A | 11/2000 |
| JP | 2001-176512 A | 6/2001 |
| JP | 2003-272625 A | 9/2003 |
| JP | 2006-059558 A | 3/2006 |
| JP | 2007-250469 A | 9/2007 |
| JP | 2009-266795 A | 11/2009 |
| JP | 2011-057541 A | 3/2011 |
| JP | 2012-006826 A | 1/2012 |
| JP | 2012-099468 A | 5/2012 |
| JP | 2012-164638 A | 8/2012 |
| WO | WO-2012/046669 A1 | 4/2012 |
| WO | WO-2012/088705 A1 | 7/2012 |

OTHER PUBLICATIONS

Yanwu Zhu et al., Science vol. 332 pp. 1537-1541 (2011), "Carbon-Based Supercapacitors Produced by Activation of Graphene" (6 pages).

Xin Zhao, et al., Advanced Energy Materials, (2011), vol. 1, pp. 1079-1084, "In-Plane Vacancy-Enabled High- Power Si-Graphene Composite Electrode for Lithium-Ion Batteries" (6 pages).

Yoshiaki Matsuo, et al. Carbon, vol. 47 (2009) 804-811 "Preparation and characterization of pillard carbons obtained by pyrolysis of silylated graphite oxides" (8 pages).

Japanese Office Action issued by the Japan Patent Office for Japanese Application No. 2015-508687 dated Nov. 28, 2017 (4 pages).

Matsuo, Y., et al., "Preparation of Pillared Carbons by Pyrolysis of Silylated Graphite Oxide," Chemistry Letters, The Chemical Society of Japan, vol. 36, No. 8, pp. 1050-1051 (2007).

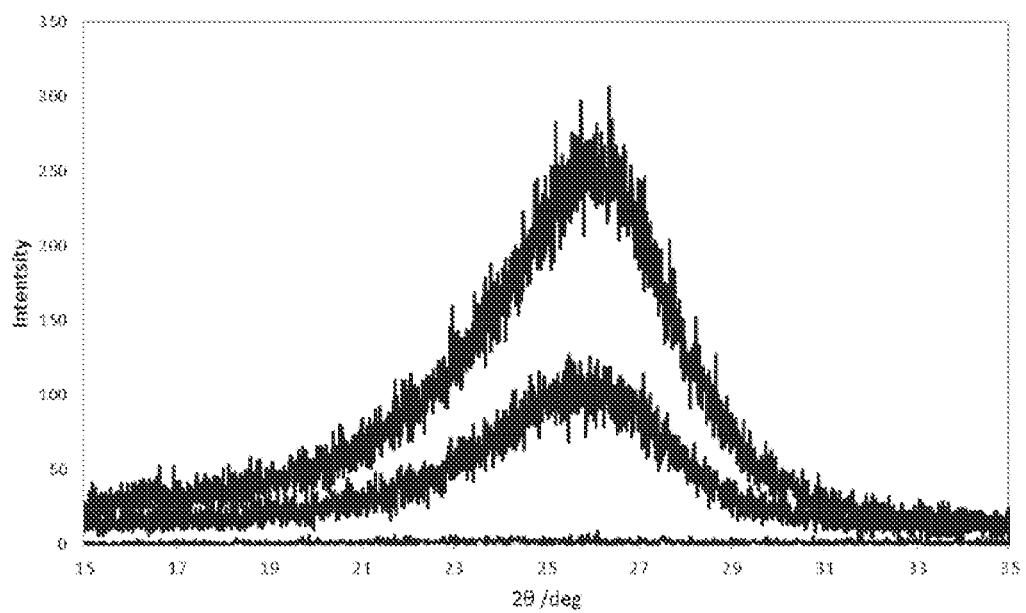

NEGATIVE ELECTRODE CARBON MATERIAL FOR LITHIUM SECONDARY BATTERY, NEGATIVE ELECTRODE FOR LITHIUM SECONDARY BATTERY, AND LITHIUM SECONDARY BATTERY

CROSS-REFERENCE TO RELATED APPLICATIONS

This application is a national stage application of International Application No. PCT/JP2014/058821 entitled "Negative Electrode Carbon Material for Lithium Secondary Battery, Negative Electrode for Lithium Secondary Battery, and Lithium Secondary Battery" filed on Mar. 27, 2014, which claims priority to Japanese Application No. 2013-074469 filed on Mar. 29, 2013, the disclosures of which are hereby incorporated by reference in their entirety.

TECHNICAL FIELD

The present invention relates to a negative electrode carbon material for a lithium secondary battery, a negative electrode for a lithium secondary battery, and a lithium secondary battery.

BACKGROUND ART

Lithium secondary batteries have the advantages of high energy density, little self-discharge, excellent long-term reliability and the like, and are therefore broadly put to practical use as batteries for small-size electronic devices such as laptops and cellular phones. In recent years, high functionalization of electronic devices and utilization of lithium secondary batteries for electric cars have progressed, and the development of higher-performance lithium secondary batteries is demanded.

At present, carbon materials are common as negative electrode active materials for lithium secondary batteries, and various types of carbon materials are proposed in order to improve the battery performance.

For example, Patent Literature 1 discloses a lithium secondary battery using an amorphous carbon material as a negative electrode active material and lithium manganate as a positive electrode active material, wherein the particle surface of the amorphous carbon material is coated with an oxidized film. Patent Literature 1 discloses that since the oxidized film suppresses formation of an inactive film to intercalation/disintercalation of lithium, and does not cause the extreme degrading even at high temperatures, the cycle life characteristics of the lithium secondary battery can be improved.

Patent Literature 2 discloses a lithium secondary battery which has a positive electrode and a negative electrode to intercalate and disintercalate lithium ions, and an organic electrolyte solution having an electrolyte containing lithium ions and dissolved therein, and in which the positive electrode and the negative electrode are arranged with a separator interposed therebetween; wherein a carbon material constituting the negative electrode is obtained by subjecting a non-graphitizable carbon to a heat treatment in an inert atmosphere or in such an atmosphere that the non-graphitizable carbon is slightly oxidized, removing decomposed gases, and thereafter subjecting the resultant to a heat treatment under pressure, and the density (butanol method) of the carbon material is 1.6 to 1.8 g/cc. Patent Literature 2 discloses as follows: lithium ions are intercalated and disintercalated mainly by 6-membered layers of the carbon material; then, the lithium ions intercalated by the 6-membered layers have only a low reactivity with the electrolyte solution; therefore, the capacity reduction of the negative electrode due to side-reactions can be reduced, and the lithium secondary battery excellent in the high-temperature storage characteristics can be realized.

CITATION LIST

Patent Literature

Patent Literature 1: JP2000-311686A
Patent Literature 2: JP2001-176512A

SUMMARY OF INVENTION

Technical Problem

In recent years, there has been a demand of lithium secondary batteries for a high input characteristic of enabling input in a short time after discharge. Lithium secondary batteries using an amorphous carbon among carbon materials as their negative electrode active material have the high input characteristic, but cannot satisfy the capacity characteristic.

The object of the present invention is to solve the above-mentioned problem, that is, to provide a negative electrode carbon material capable of providing a lithium secondary battery improved in the capacity characteristic, and a negative electrode for a lithium secondary battery and a lithium secondary battery using the negative electrode carbon material.

Solution to Problem

An aspect of the present invention provides a negative electrode carbon material for a lithium secondary battery, comprising an oxidized amorphous carbon material comprising oxidized graphene layers.

Another aspect of the present invention provides a negative electrode for a lithium secondary battery, comprising the above negative electrode carbon material.

Another aspect of the present invention provides a lithium secondary battery comprising the above negative electrode.

Advantageous Effects of Invention

The exemplary embodiment can provide a negative electrode carbon material capable of providing a lithium secondary battery improved in the capacity characteristic, and a negative electrode for a lithium secondary battery and a lithium secondary battery using the negative electrode carbon material.

BRIEF DESCRIPTION OF DRAWING

FIG. 1 shows XRD patterns of the carbon materials of Examples 1 and 2 and Comparative Example.

DESCRIPTION OF EMBODIMENT

A negative electrode carbon material for a lithium secondary battery according to the exemplary embodiment comprises an oxidized amorphous carbon material comprising oxidized graphene layers. The oxidized amorphous carbon material can be obtained by subjecting an amorphous carbon to an oxidation treatment so that graphene layers of carbon crystallites contained in the amorphous carbon are oxidized. It is preferable that the oxidation treatment oxidize as many graphene layers as possible of carbon crystallites; and it is more preferable that all graphene layers be oxidized. Further, it is preferable that graphene layers of as many carbon crystallites as possible in the amorphous carbon be oxidized; and it is more preferable that graphene layers of all carbon crystallites be oxidized.

According to the present exemplary embodiment, reaction sites (Li reaction sites) with lithium ions can be increased to increase the reaction capacity; and use of the carbon material as a negative electrode can improve the capacity characteristic of a lithium secondary battery.

The element ratio of oxygen to carbon (O/C ratio) of the oxidized amorphous carbon material constituting the negative electrode carbon material according to the present exemplary embodiment is preferably in the range of 0.01 to 1, more preferably in the range of 0.01 to 0.5, still more preferably in the range of 0.05 to 0.5, and especially preferably in the range of 0.05 to 0.33. When the O/C ratio is too low, a sufficient effect of improving the capacity characteristic cannot be attained; and reversely when the O/C ratio is too high, the battery characteristics such as the input characteristic are impaired in some cases.

The peak corresponding to (002) in the vicinity of $2\theta=26°$ in the XRD pattern of the oxidized amorphous carbon material is positioned at a lower angle side, assumes a lower intensity and becomes broader than in a graphite and an amorphous carbon before being oxidized (FIG. 1). In the oxidation treatment to obtain the oxidized amorphous carbon material, the oxidation can be carried out so that the intensity of the peak after the oxidation decreases to ⅕ or lower of the intensity of the peak before the oxidation. A negative electrode carbon material comprising such an oxidized amorphous carbon material is distinguished from usual amorphous carbon such as amorphous carbon whose surface has been naturally oxidized or amorphous carbon having functional groups containing oxygen bound thereon.

The oxidation to obtain the oxidized amorphous carbon material can be carried out by an oxidation treatment by, for example, a Brodie method or a Modified Hummers method, or a heat treatment in an oxidative atmosphere. The oxidation by a heat treatment can be carried out in an atmosphere containing oxygen such as air, or in an oxidative gas-containing atmosphere. The heat treatment temperature can be set in the range of 500 to 800° C., and the heat treatment time can be set in the range of 0.5 to 24 hours.

The oxidized amorphous carbon material can be subjected to a reduction treatment to thereby regulate the O/C ratio in the above range. The reduction treatment can be carried out, for example, by a heat treatment. This heat treatment can be carried out in an inert atmosphere such as nitrogen or argon. The heat treatment temperature can be set in the range of 500 to 1,200° C., and the heat treatment time can be set in the range of 0.5 to 24 hours.

Holes can be formed in the oxidized graphene layer planes. That is, the holes can be formed in regions (oxidized graphene layer planes (basal planes)) other than edges of stacking parts of oxidized graphene layers formed by oxidation of carbon crystallites. The formation of the holes increases Li reaction sites and therefore can increase the reaction capacity; and the use of such a carbon material for the negative electrode can improve the capacity characteristic of a lithium secondary battery.

Such holes are formed preferably also in oxidized graphene layer planes present on the inner side than an oxidized graphene layer on the surface side of carbon crystallites, more preferably at least in 3 layers from the surface layer to the inner sides, and still more preferably at least in 5 layers from the surface layer to the inner sides. Holes can be formed in more layers (for example, 10 or more layers) from the surface layer to the inner sides, and can also be formed in all oxidized graphene layers or graphene layers constituting carbon crystallites. Further holes can also be formed so as to penetrate through a plurality of oxidized graphene layers.

Holes in the oxidized graphene layer planes present in the inner sides than the surface layer can be observed by cutting a carbon material by various methods to expose a cross-section thereof, and observing the cross-section by an electron microscope such as TEM or SEM.

The hole-opening size of the holes formed in the oxidized graphene layers is not especially limited as long as being able to contribute to the improvement of the capacity characteristic and not adversely affecting other battery characteristics such as the input characteristic, but can be set at a nanometer size, and is preferably 2 nm or larger and 10 nm or smaller. Here, the "nanometer size" means a few nanometers including 1 nm to a few tens of nanometers (smaller than 50 nm). Here, the "hole-opening size" means a maximum length of a hole-opening (maximum hole-opening size), and corresponds to a diameter of a circle having a minimum area being able to accommodate the contour of a hole-opening. From the viewpoint of providing a sufficient effect of forming the holes, also a hole-opening size (minimum hole-opening size) corresponding to a diameter of a circle having a maximum area being able to be present on the inner side of the contour of the hole-opening can be set at a nanometer size, and is preferably 2 nm or larger and 10 nm or smaller.

The density of the number of holes having such hole-opening sizes is preferably in the range of 100 to 600 holes/$\mu m^2$, and more preferably in the range of 200 to 500 holes/$\mu m^2$. When the number density of holes is too low, a sufficient effect of forming holes cannot be provided. Reversely when the number density of holes is too high, the specific surface area becomes too large and side-reactions in charge and discharge are liable to be caused, resulting that the charge and discharge efficiency decreases in some cases. The number density of holes can be determined as follows: 10 regions of 100 nm×100 nm of a surface of an oxidized amorphous carbon material in an electron microscope image thereof are arbitrary selected; the numbers of holes of 2 nm or larger in hole-opening size are counted for the each region; and they are averaged to obtain the number density of holes as an average value (holes/$\mu m^2$) for 10 regions.

The present exemplary embodiment can form an oxidized amorphous carbon material in which the number density of holes hardly varies from a surface layer nearly to a third layer of the inner side of carbon crystallites. Holes can further be formed which penetrate through a plurality of layers from a surface layer to the inner sides, and holes which reach nearly a 30th layer can even be formed. At this time, as going deeper from a surface layer to the inner sides, it is likely that the hole-opening size of holes becomes small and the number density of holes decreases. From the viewpoint of providing a sufficient hole-forming effect, it is preferable that the number density of holes be in the above range at least in oxidized graphene layers of a surface layer and the inner-side layer thereof; it is more preferable that the number density of holes be in the above range at least in oxidized graphene layers from a surface layer (first layer) to the third layer; it is still more preferable that the number density of holes be in the above range at least in oxidized graphene layers from a surface layer to the fifth layer including the surface layer; and the number density of holes may be made in the above range at least in oxidized graphene layers from a surface layer to the 10th layer.

Further, it is preferable that holes be formed so as to be distributed over the whole surface of the oxidized graphene layer plane; and the uniform distribution thereof is more preferable. It is preferable that the interval between a plurality of holes (a minimum distance between hole-openings of adjacent holes, an average value) be in the range of 10 to 100 nm. When holes are thus formed, the hole-forming effect (improvement of the capacity characteristic) can be more enhanced. The hole interval can be determined as follows: 10 regions of 100 nm×100 nm of a surface of an oxidized amorphous carbon material in an electron microscope image thereof are arbitrary selected; the intervals between holes are measured for the each region; and they are averaged to obtain the hole interval as an average value for 10 regions.

Such holes differ from voids intrinsic to amorphous carbon materials (voids between primary particles, defects, and voids and cracks in the edge vicinity). Even if a usual amorphous carbon is used for a negative electrode, the capacity characteristic of the lithium secondary battery is not sufficient.

It is preferable that the formation of the holes be carried out after oxidation of an amorphous carbon, because of ease of the formation. The formation of the holes in the oxidized amorphous carbon material can be carried out by a heat treatment in an inert atmosphere, an ultrasonic treatment in which the oxidized amorphous carbon material is immersed in a nitric acid aqueous solution and irradiated with ultrasonic waves, or an activation treatment such as chemical activation or gas activation. The heat treatment (reduction treatment) for the hole formation can be carried out in an inert atmosphere such as nitrogen or argon. At this time, the heat treatment temperature can be set in the range of 500 to 1,200° C., and the heat treatment time can be set in the range of 0.5 to 24 hours. These can be set, for example at 800° C. and for 3 hours.

In such a hole-forming method, the following is conceivable: functional groups containing oxygen increase due to the oxidation of the amorphous carbon; a part of the functional groups together with carbon is removed by a treatment such as the heat treatment following the oxidation to thereby form holes having defects and the functional groups in the carbon structure of graphene; and the defects and the functional groups of the hole parts react with Li to thereby increase the capacity.

An oxidized amorphous carbon material may be formed by forming holes in an amorphous carbon before the oxidation treatment, and thereafter oxidizing the amorphous carbon. In this case, an amorphous carbon can be subjected to an immersion treatment with an alkali aqueous solution such as a KOH aqueous solution, to a solid-liquid separation treatment such as filtration, and thereafter to a heat treatment to thereby form holes. This treatment may be carried out also on an oxidized amorphous carbon material, and holes may be formed in the oxidized amorphous carbon material.

As the alkali aqueous solution, there can be used one in which an alkaline metal compound, an alkaline earth metal compound or the like is dissolved in an aqueous solvent, but a KOH aqueous solution is preferable. The concentration of the alkaline metal compound such as KOH and alkaline earth metal compound can be set in the range of 0.1 M to 10 M.

The immersion time of the amorphous carbon in the alkali aqueous solution can be set in the range of 1 min to 24 hours; and as required, stirring can be carried out suitably during the immersion. The temperature of the alkali aqueous solution during the immersion can be set in the range of 10° C. to 60° C., and is preferably in the range of 20° C. to 50° C.

The heat treatment after the immersion treatment can be carried out in an inert atmosphere such as a nitrogen atmosphere or an argon atmosphere. The heat treatment temperature can be set in the range of 400° C. to 1,200° C.; and the heat treatment time can be set to be 0.5 hours to 24 hours. The amorphous carbon after the heat treatment is washed with water and dried to thereby obtain an amorphous carbon material having holes formed therein.

For example, when an amorphous carbon is immersed in a KOH aqueous solution, KOH crystals are spottedly distributed and formed over the whole plane of a graphene layer. In the heat treatment thereafter, a reaction represented by $2KOH+C \rightarrow 2K+H_2O+CO$ is caused. Then, carbon at positions where the KOH crystals are formed becomes deficient, or further carbon in their vicinity becomes deficient, whereby holes in the same size as or larger sizes than the KOH crystals are formed. Such a reaction can progress successively also in inner-side graphene layers to thereby form holes also in inner-side graphene layers.

The hole-opening size, the number density and the distribution of holes depend on the size, the number density and the distribution of crystals of KOH crystals and the like, and can be controlled by immersion conditions such as the concentration of the alkali aqueous solution of KOH or the like, the immersion time, the immersion temperature and the stirring during the immersion. They can further be controlled by the heat treatment conditions, such as the heat treatment temperature, the heat treatment time and the atmosphere, after the immersion treatment.

The amorphous carbon is not especially limited, but is preferably one in which the interlayer spacing ($d_{002}$) of the 002 planes by X-ray diffractometry exceeds 0.340 nm, more preferably one in which that is 0.350 nm or larger, and still more preferably one in which that is 0.360 nm or larger, and preferably 0.380 nm or smaller. Such an amorphous carbon includes soft carbons (including ones in which graphite crystal phases are present in a part of the phase structure) such as carbon materials obtained by subjecting organic materials such as tar pitch to a heat treatment (2,500° C. or lower), coke, mesocarbon microbeads (MCMB) and carbon fibers, and hard carbons such as carbon materials obtained by subjecting polymeric resins such as phenol resins to a heat treatment.

Silicon oxide can be contained between oxidized graphene layers. It is preferable that the silicon oxide be formed in a pillar shape interposed between two oxidized graphene layers in stacking parts of oxidized graphene layers formed by oxidizing carbon crystallites. The interlayer distance of the oxidized carbon crystallites can thereby be expanded. The interlayer distance at this time is preferably in the range of 0.8 to 2 nm, and more preferably in the range of 1 to 1.8 nm. Thereby, the repulsion between Li bound to the oxidized graphene or the graphene weakens, and Li reaction sites can thus be increased. Further, the diffusion rate of Li ions can be increased.

It is preferable that the silicon oxide should not react with lithium, and the composition of such a silicon oxide is preferably $SiO_x$ (x=1.5 to 2).

The oxidized amorphous carbon material containing such a silicon oxide can be obtained, for example, by heating and refluxing an oxidized amorphous carbon material in an organic solvent such as toluene containing a silane compound such as 3-aminopropylmethyldiethoxysilane.

In the oxidized amorphous carbon material according to the present exemplary embodiment, a metal alloyable with Li or an oxide thereof can be formed on the oxidized graphene layer. The metal or the metal oxide is capable of reacting with lithium, and is electrochemically active in charge and discharge of a lithium secondary battery. As such a metal or metal oxide, there can be used at least one metal selected from the group consisting of Si, Ge, Sn, Pb, Al, Ga, In and Mg, or an oxide thereof.

It is preferable that such a metal or metal oxide be formed in the circumference of holes formed in the oxidized graphene layer.

The formation of such a metal or metal oxide enables the increase of the reaction capacity. Particularly the formation of a metal or metal oxide in the hole circumference enables the metal or metal oxide to more strongly bind with the oxidized graphene layer in the hole circumference than in other sites, and thus can increase Li reaction sites excellent in reversibility to improve the reaction capacity.

Forming means of such a metal or metal oxide includes CVD (chemical vapor deposition method), sputtering, electroplating, electroless plating and a hydrothermal synthesis method.

The content of the metal or metal oxide is preferably 0.1 to 30% by mass with respect to the oxidized amorphous carbon material. When the content is too low, a sufficient incorporation effect cannot be attained; and when the content is too high, the influence of the volume expansion and contraction in the charge and discharge time of the metal or metal oxide becomes large and the carbon material becomes liable to degrade.

The oxidized amorphous carbon material according to the present exemplary embodiment can be coated with an amorphous carbon. The amorphous carbon (amorphous carbon coat) coating the material can suppress side-reactions of the carbon material with an electrolyte solution to improve the charge and discharge efficiency and increase the reaction capacity.

A method for coating the oxidized amorphous carbon material with an amorphous carbon (forming method of an amorphous carbon coat) includes a hydrothermal synthesis method, CVD and sputtering.

The formation of an amorphous carbon coat by the hydrothermal synthesis method can be carried out, for example, as follows. First, a powder of an oxidized amorphous carbon material is immersed and mixed in a carbon precursor solution. Thereafter, the powder is separated by vacuum filtration. Then, the separated powder is subjected to a heat treatment in an inert atmosphere. Then, the obtained aggregates of the powder are crushed into a desired uniform particle diameter. As the carbon precursor solution, various types of sugar solutions can be used, and particularly a sucrose aqueous solution is preferable. The sucrose concentration of the aqueous solution can be set to be 0.1 to 10 M, and the immersion time can be set to be 1 min to 24 hours. The heat treatment can be carried out in an inert atmosphere such as nitrogen or argon at 400 to 1,200° C. for 0.5 to 24 hours.

The oxidized amorphous carbon material described hitherto can have one constitution or a combination of two or more constitutions selected from: the constitution in which holes are formed in oxidized graphene layer planes; the constitution in which silicon oxide is contained between oxidized graphene layers; the constitution in which a metal alloyable with Li or an oxide thereof is formed on oxidized graphene layers; and the constitution in which an oxidized amorphous carbon material is coated with an amorphous carbon.

The negative electrode carbon material according to the present exemplary embodiment can be used in a particulate form, from the viewpoint of the filling efficiency, the mixability, the formability and the like. The shape of the particle includes spherical ones, ellipsoidal ones and scaly ones. A usual globulizing treatment may also be carried out.

The average particle diameter of the negative electrode carbon material according to the present exemplary embodiment is preferably 1 μm or larger, more preferably 2 μm or larger, and still more preferably 5 μm or larger, from the viewpoint of suppressing side-reactions in the charge and discharge time to suppress the decrease of the charge and discharge efficiency, and preferably 40 μm or smaller, more preferably 35 μm or smaller, and still more preferably 30 μm or smaller, from the viewpoint of the input and output characteristic and the viewpoint of fabrication of an electrode (smoothness of an electrode surface, and the like). Here, the average particle diameter means a particle diameter (median diameter: $D_{50}$) at a cumulative value of 50% in a particle size distribution (in terms of volume) by a laser diffraction scattering method.

The BET specific surface area (based on a measurement at 77 K by a nitrogen adsorption method) of the negative electrode carbon material according to the present exemplary embodiment is preferably smaller than 10 $m^2/g$, and more preferably 5 $m^2/g$ or smaller, from the viewpoint of suppressing side-reactions in the charge and discharge time to suppress the decrease of the charge and discharge efficiency. On the other hand, from the viewpoint of providing the sufficient input and output characteristic, the BET specific surface area is preferably 0.5 $m^2/g$ or larger, and more preferably 1 $m^2/g$ or larger.

The negative electrode carbon material described hitherto can be applied to a negative electrode active material of a lithium ion secondary battery, and can form a carbon-based negative electrode suitable for a lithium ion secondary battery. By using a negative electrode containing the carbon material as a negative electrode active material, a lithium ion secondary battery high in the input characteristic and improved in the capacity characteristic can be provided.

A negative electrode for a lithium ion secondary battery can be fabricated, for example, by forming a negative electrode active material layer containing a negative electrode active material composed of the carbon material, and a binder, on a negative electrode current collector. The negative electrode active material layer can be formed by a usual slurry applying method. Specifically, a slurry containing a negative electrode active material, a binder and a solvent is prepared, and applied on a negative electrode current collector, dried, and as required, pressed to thereby obtain a negative electrode. An applying method of the negative electrode slurry includes a doctor blade method, a die coater method, and a dip coating method. A negative electrode may also be obtained by in advance forming a negative electrode active material layer, and thereafter forming a thin film of aluminum, nickel or an alloy thereof as a current collector by a method of vapor deposition, sputtering or the like.

The binder for the negative electrode is not especially limited, but includes polyvinylidene fluoride (PVdF), vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide, polyamideimide, methyl(meth)acrylate, ethyl(meth)acrylate, butyl (meth)acrylate, (meth)acrylonitrile, isoprene rubber, butadiene rubber, and fluororubber. As the slurry solvent, N-methyl-2-pyrrolidone (NMP) and water can be used. In the case of using water as the solvent, further as a thickener, there can be used carboxymethyl cellulose, methyl cellulose, hydroxymethyl cellulose, ethyl cellulose, or polyvinyl alcohol.

The content of the binder for the negative electrode is preferably in the range of 0.1 to 30 parts by mass with respect to 100 parts by mass of a negative electrode active material, more preferably in the range of 0.5 to 25 parts by mass, and still more preferably in the range of 1 to 20 parts by mass, from the viewpoint of the binding capability and the energy density, which are in a tradeoff relationship.

The negative electrode current collector is not especially limited, but, from the viewpoint of the electrochemical stability, is preferably copper, nickel, a stainless steel, molybdenum, tungsten, tantalum or an alloy containing two or more thereof. The shape includes a foil, a flat plate and a mesh form.

A lithium ion secondary battery according to the present exemplary embodiment comprises the negative electrode, a positive electrode and an electrolyte.

A positive electrode can be fabricated, for example, by preparing a slurry containing a positive electrode active material, a binder and a solvent (further as required, a conductive auxiliary agent), and applying the slurry on a positive electrode current collector, drying, and as required, pressing the resultant to thereby form a positive electrode active material layer on the positive electrode current collector.

The positive electrode active material is not especially limited, but for example, a lithium composite oxide or an iron lithium phosphate can be used. The lithium composite oxide includes lithium manganate ($LiMn_2O_4$); lithium cobaltate ($LiCoO_2$); lithium nickelate ($LiNiO_2$); compounds in which at least a part of manganese, cobalt or nickel of these lithium compounds is substituted with another metal element such as aluminum, magnesium, titanium or zinc; nickel-substituted lithium manganates in which a part of manganese of lithium manganate is substituted at least with nickel; cobalt-substituted lithium nickelates in which a part of nickel of lithium nickelate is substituted at least with cobalt; compounds in which a part of manganese of the nickel-substituted lithium manganates is substituted with another metal (for example, at least one of aluminum, magnesium, titanium and zinc); and compounds in which a part of nickel of the cobalt-substituted lithium nickelates is substituted with another metal element (for example, at least one of aluminum, magnesium, titanium and zinc). These lithium composite oxides may be used singly or as a mixture of two or more. With respect to the average particle diameter of the positive electrode active material, the positive electrode active material having an average particle diameter, for example, in the range of 0.1 to 50 μm can be used, from the viewpoint of the reactivity with an electrolyte solution, the rate characteristic and the like; the positive electrode active material having an average particle diameter in the range of 1 to 30 μm can be preferably used; and that in the range of 5 to 25 μm can be more preferably used. Here, the average particle diameter means a particle diameter (median diameter: $D_{50}$) at a cumulative value of 50% in a particle size distribution (in terms of volume) by a laser diffraction scattering method.

The binder for the positive electrode is not especially limited, and the same ones as the binders for the negative electrode can be used. Among these, from the viewpoint of the versatility and the low cost, polyvinylidene fluoride is preferable. The content of the binder for the positive electrode is preferably in the range of 1 to 25 parts by mass with respect to 100 parts by mass of a positive electrode active material, more preferably in the range of 2 to 20 parts by mass, and still more preferably in the range of 2 to 10 parts by mass, from the viewpoint of the binding capability and the energy density, which are in a tradeoff relationship. Binders other than polyvinylidene fluoride (PVdF) include vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide and polyamideimide. As a slurry solvent, N-methyl-2-pyrrolidone (NMP) can be used.

The positive electrode current collector is not especially limited, but from the viewpoint of the electrochemical stability, there can be used, for example, aluminum, titanium, tantalum, a stainless steel (SUS), another valve metal or an alloy thereof. The shape includes a foil, a flat plate shape and a mesh form. Particularly an aluminum foil can suitably be used.

When a positive electrode is fabricated, a conductive auxiliary agent may be added for the purpose of reducing the impedance. The conductive auxiliary agent includes carbonaceous microparticles of graphite, carbon black, acetylene black or the like.

As the electrolyte, there can be used a nonaqueous electrolyte solution in which a lithium salt is dissolved in one or two or more nonaqueous solvents. The nonaqueous solvent is not especially limited, but examples thereof include cyclic carbonates such as ethylene carbonate (EC), propylene carbonate (PC), butylene carbonate (BC) and vinylene carbonate (VC); linear carbonates such as dimethyl carbonate (DMC), diethyl carbonate (DEC), ethyl methyl carbonate (EMC) and dipropyl carbonate (DPC); aliphatic carboxylate esters such as methyl formate, methyl acetate and ethyl propionate; γ-lactones such as γ-butyrolactone; linear ethers such as 1,2-ethoxyethane (DEE) and ethoxymethoxyethane (EME); and cyclic ethers such as tetrahydrofuran and 2-methyltetrahydrofuran. As the nonaqueous solvents, additionally, there may also be used aprotic organic solvents such as dimethyl sulfoxide, 1,3-dioxolane, dioxolane derivatives, formamide, acetamide, dimethylformamide, acetonitrile, propionitrile, nitromethane, ethyl monoglyme, phosphate triesters, trimethoxymethane, sulfolane, methyl sulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole and N-methylpyrrolidone.

The lithium salt dissolved in the nonaqueous solvent is not especially limited, but examples thereof include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$ and lithium bisoxalatoborate. These lithium salts can be used singly or in a combination of two or more. A polymer electrolyte may be used in place of the nonaqueous electrolyte solution.

A separator can be provided between the positive electrode and the negative electrode. As the separator, there can be used a porous film, a woven fabric or a nonwoven fabric composed of a polyolefin such as polypropylene or polyethylene, a fluororesin such as polyvinylidene fluoride, a polyimide, or the like.

The battery shape includes a cylinder shape, a rectangular shape, a coin type, a button type and a laminate type. In the case of the laminate type, as an outer package accommodating the positive electrode, the separator, the negative electrode and the electrolyte, a laminate film is preferably used. The laminate film contains a resin base material, a metal foil layer and a thermal fusion layer (sealant). The resin base material includes polyester and nylon; the metal foil layer includes aluminum, aluminum alloys and titanium foils; and the material of the thermal fusion layer includes thermoplastic polymer materials such as polyethylene, polypropylene and polyethylene terephthalate. The resin base material layer and the metal foil layer each are not limited to of one layer, but may be of two or more layers. From the viewpoint of the versatility and the cost, an aluminum laminate film is preferable.

The positive electrode, the negative electrode and the separator disposed therebetween are accommodated in an outer package container composed of a laminate film or the like; and an electrolyte solution is injected and sealed. A structure may be made in which an electrode group of a plurality of electrode pairs stacked is accommodated.

EXAMPLES

Example 1

Equal amounts (in mass ratio) of a powder of a soft carbon (obtained by firing a coke at 2,000° C.) and sodium nitrate were weighed out; a 98% sulfuric acid was added thereto, and stirred; thereafter, potassium permanganate was added thereto under ice cooling, allowed to stand for 2 hours, and then stirred at room temperature for 12 hours. Then, the resultant was diluted with water, and allowed to cool to about 60° C.; thereafter, a 30% hydrogen peroxide solution was added thereto, and stirred until the temperature became room temperature. An obtained oxidized amorphous carbon material was washed with water, subjected to a vacuum filtration, and thereafter vacuum dried at 70° C. for 24 hours to thereby obtain an oxidized amorphous carbon material having oxidized graphene layers.

Example 2

An oxidized amorphous carbon material obtained as in Example 1 was subjected to a heat treatment (reduction treatment) in a nitrogen atmosphere at 800° C. for 3 hours to thereby obtain an oxidized amorphous carbon material having holes formed in oxidized graphene layers.

Example 3

An oxidized amorphous carbon material obtained as in Example 1 was immersed in toluene containing 3-aminopropylmethyldiethoxysilane, and refluxed at 100° C. for 50 hours. The resultant was filtered and washed with water, thereafter vacuum dried at 70° C. for 24 hours, and subjected to a heat treatment in a nitrogen atmosphere at 600° C. for 5 hours to thereby obtain an oxidized amorphous carbon material containing a silicon oxide.

Example 4

A powder of an oxidized amorphous carbon material obtained as in Example 2 was immersed in a 1 M sucrose aqueous solution, and mixed by a mixer for 10 min. Thereafter, the mixture was subjected to a vacuum filtration to thereby separate a solid content; and the solid content was subjected to a heat treatment in a nitrogen atmosphere at 1,000° C. for 3 hours to thereby obtain an aggregate of an oxidized amorphous carbon material coated with an amorphous carbon. The obtained aggregate was crushed to thereby obtain an oxidized amorphous carbon material having a predetermined average particle diameter.

(Measurement of the Crystal Structures)

The crystal structures of the carbon materials of Comparative Example 1 (before the oxidation of the soft carbon), Example 1 (after the oxidation) and Example 2 (reduced after the oxidation) were measured by X-ray diffractometry (XRD). FIG. 1 shows XRD patterns. In the figure, peaks in the vicinity of $2\theta=26°$ correspond to Comparative Example 1 (before the oxidation), Example 2 (reduced after the oxidation) and Example 1 (after the oxidation) in order of peak intensity.

As shown in the figure, it is seen that the peak intensity in the vicinity of $2\theta=26°$ was ⅕ or less (in the present Example, almost disappearing) due to the oxidation, and ½ or less even after the reduction thereafter. Since the peak position after the reduction was present at a lower angle side than in the original soft carbon, it is further clear that oxygen remained in the crystal interior even after the reduction and the interlayer spacing expanded.

(Measurement of O/C Ratio in the Oxidation State)

The O/C ratios of the obtained carbon materials were measured by X-ray photoelectron spectroscopy (XPS). The results are shown in Table 1.

(Charge and Discharge Test)

An oxidized soft carbon, a conductive agent (carbon black) and a binder (PVdF) were mixed in a mass ratio of oxidized soft carbon:conductive agent:binder=92:1:7, and dispersed in NMP to thereby fabricate a slurry. The slurry was applied on a copper foil, dried and rolled, and thereafter the resultant was cut into 22×25 mm to thereby obtain an electrode. The electrode as a working electrode was combined with a Li foil of a counter electrode with a separator interposed therebetween to thereby obtain a laminate. The laminate and an electrolyte solution (a mixed solution of EC and DEC containing 1 M LiPF$_6$, volume ratio of EC/DEC=3/7) were sealed in an aluminum laminate to thereby fabricate a battery.

At predetermined current values, charge (Li was intercalated in the working electrode) was carried out up to 0 V of the potential of the working electrode against the counter electrode, and discharge (Li was disintercalated from the working electrode) was carried out up to 1.5 V. With respect to the current values during the charge and discharge, a current value at which a discharge capacity of the working electrode was allowed to flow by taking 1 hour was taken as 1 C, and the charge and the discharge of the first cycle and the second cycle were carried out in 0.1 C charge-0.1 C discharge; and those of the third cycle, in 0.5 C charge-0.1 C discharge.

As charge and discharge characteristics, the initial discharge capacity (discharge capacity of the first cycle) and the charge rate characteristic (discharge capacity of the third cycle/discharge capacity of the second cycle) were determined. The results are shown in Table 1.

TABLE 1

|  | O/C Ratio | Initial Discharge Capacity (mAh/g) | 0.5 C/0.1 C Charge Rate Characteristic (%) |
|---|---|---|---|
| Example 1 | 0.33 | 194 | 66 |
| Example 2 | 0.08 | 257 | 62 |
| Example 3 | 0.25 | 272 | 69 |
| Example 4 | 0.05 | 265 | 71 |
| Comparative Example 1 | 0.001 | 177 | 63 |

As shown in Table 1, it is clear that the use of the oxidized amorphous carbon materials (Examples 1 to 4) improved the discharge capacity without impairing the charge rate characteristic.

Further, the use of the oxidized amorphous carbon material (Example 2) having holes formed by the reduction treatment remarkably improved the discharge capacity. Further, the use of the oxidized amorphous carbon material (Example 3) containing the silicon oxide more remarkably improved the discharge capacity than Example 1, which contained no silicon oxide, and also more improved the charge rate characteristic. The oxidized amorphous carbon material (Example 4) coated with the amorphous carbon exhibited a more improved discharge capacity and charge rate characteristic than Example 2, which was coated with no amorphous carbon.

Hitherto, the present invention has been described by reference to the exemplary embodiments and the Examples, but the present invention is not limited to the exemplary embodiments and the Examples. To the constitution and details of the present invention, various changes and modifications understandable to those skilled in the art may be made within the scope of the present invention.

This application claims priority right based on Japanese Patent Application No. 2013-74469, filed on Mar. 29, 2013, the entire disclosure of which is hereby incorporated by reference.

The invention claimed is:

1. A negative electrode carbon material for a lithium secondary battery, comprising an oxidized amorphous carbon material comprising oxidized graphene layers,
   wherein at least one of the oxidized graphene layers comprises a hole in plane, and a hole-opening size of the hole is 2 nm to 10 nm,
   wherein a density of a number of the holes having the hole opening size is in a range of 100-600 holes per square micrometer, and
   wherein the oxidized graphene layers contain a silicon oxide therebetween.

2. The negative electrode carbon material according to claim 1, wherein the oxidized amorphous carbon material has an element ratio of oxygen to carbon (O/C ratio) in the range of 0.01 to 1.

3. The negative electrode carbon material according to claim 1,
   wherein the oxidized amorphous carbon material is obtained by oxidizing an amorphous carbon material, and
   wherein the amorphous carbon material contains a carbon crystallite, and the carbon crystallite comprises a layered graphene.

4. The negative electrode carbon material according to claim 1, wherein the oxidized graphene layers comprises a layered oxidized graphene having the hole.

5. The negative electrode carbon material according to claim 3, wherein the hole penetrates the plural oxidized graphene layers of the layered graphene in the carbon crystallite.

6. The negative electrode carbon material according to claim 3, wherein the plurality of the holes are formed by reducing the amorphous carbon material, after oxidizing the amorphous carbon material, in an inert atmosphere with heating.

7. The negative electrode carbon material according to claim 1, wherein the silicon oxide has a composition represented by $SiO_x$ (x=1.5 to 2).

8. The negative electrode carbon material according to claim 1, wherein the silicon oxide is formed in a pillar shape between the oxidized graphene layers.

9. The negative electrode carbon material according to claim 1, wherein a metal alloyable with lithium or an oxide thereof is formed on the oxidized graphene layers.

10. The negative electrode carbon material according to claim 1, further comprising amorphous carbon coatings covered on the oxidized amorphous carbon material.

11. The negative electrode carbon material according to claim 1, wherein the oxidized amorphous carbon material is obtained by oxidizing an amorphous carbon material selected from a hard carbon comprising hardly graphitizable carbon or a soft carbon comprising an easily graphitizable carbon.

12. A negative electrode for a lithium secondary battery, comprising the negative electrode carbon material according to claim 1.

13. A lithium secondary battery, comprising the negative electrode according to claim 12.

* * * * *